March 12, 1957 R. G. NISLE 2,785,356
TRANSDUCER
Filed June 13, 1955 2 Sheets-Sheet 1

INVENTOR.
R. G. NISLE

BY
Hudson & Young
ATTORNEYS

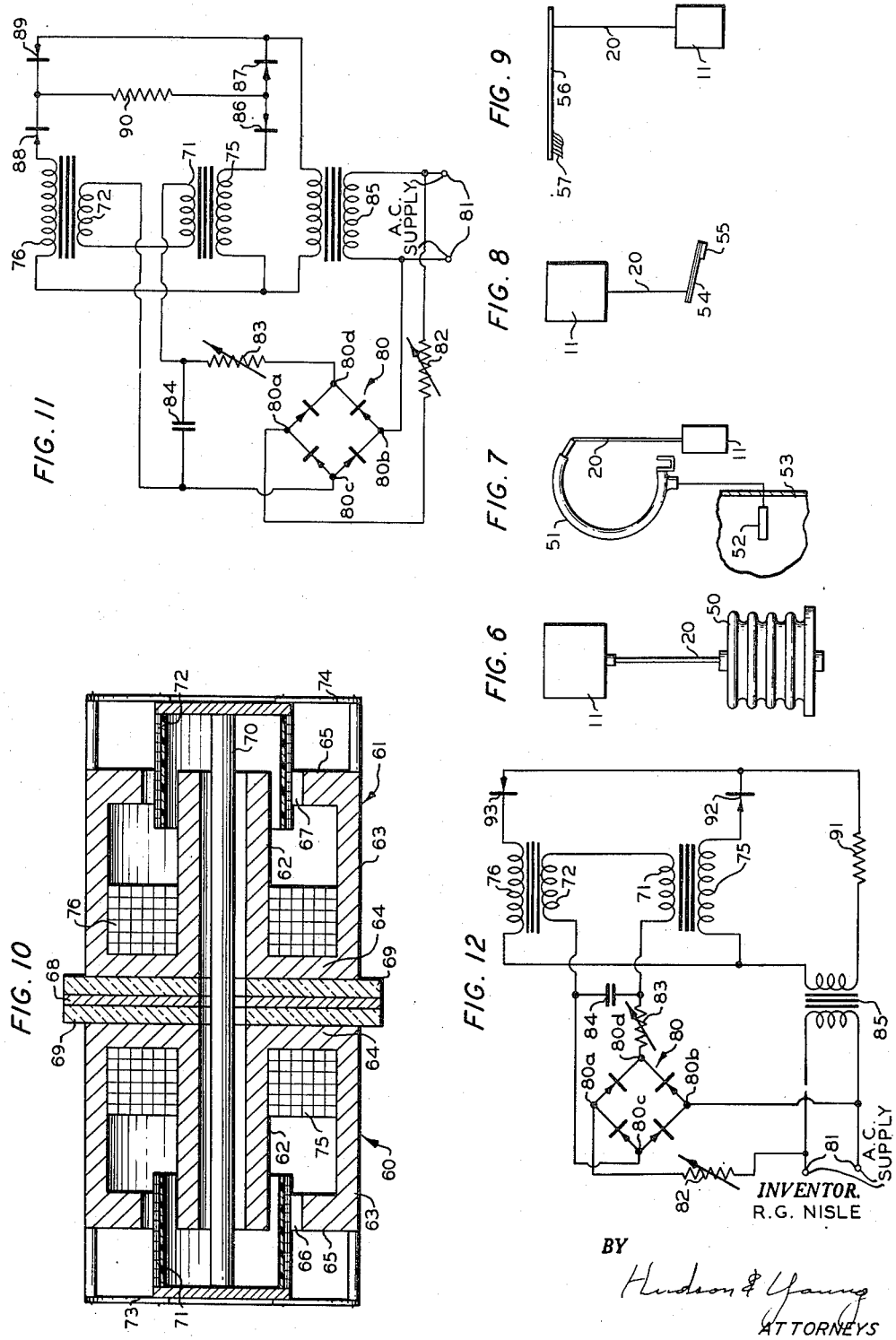

United States Patent Office 2,785,356
Patented Mar. 12, 1957

2,785,356
TRANSDUCER

Robert G. Nisle, Bartlesville, Okla., assignor to Phillips Petroleum Company, a corporation of Delaware Application June 13, 1955, Serial No. 515,091

13 Claims. (Cl. 318—128)

This invention relates to transducers. In another aspect, it relates to a system for producing an electrical output representative of a mechanical displacement.

Various types of transducers have been proposed for producing an electrical output representing a mechanical displacement. However, in certain applications, problems arise in connection with the construction and operation of such transducers. For example, if the transducer is sufficiently sensitive to respond to minute displacements, the electrical output is correspondingly small, and must be amplified before any useful result can be obtained. Conversely, if the transducer itself produces a satisfactory electrical output, it is not sufficiently sensitive to measure small and/or rapid displacements.

In accordance with this invention, a magnetic amplifier unit is incorporated in the transducer itself with the result that a high electrical output is obtained without sacrifice of sensitivity and speed of response. In this manner, small variations in temperature, pressure and mechanical deflection can be measured with great accuracy by a small compact unit which produces an electrical output sufficient to directly actuate an alarm, indicator or power device.

Accordingly, it is an object of the invention to provide an improved mechano-electric transducer.

It is a further object to provide such a device that will produce a high electrical output without sacrifice of sensitivity and/or speed of response.

It is a further object to provide a self-contained compact unit of this type not requiring external amplification of the resultant signal.

Various other objects, advantages and features of the invention will become apparent from the following detailed description taken in conjunction with the accompanying drawings, in which.

Figures 6 to 9, inclusive, are schematic views illustrating applications of the invention;

Figure 10 is a vertical sectional view of a modified form of transducer; and

Figures 11 and 12 are schematic diagrams of circuits used with the transducer of Figure 10.

Figure 1:
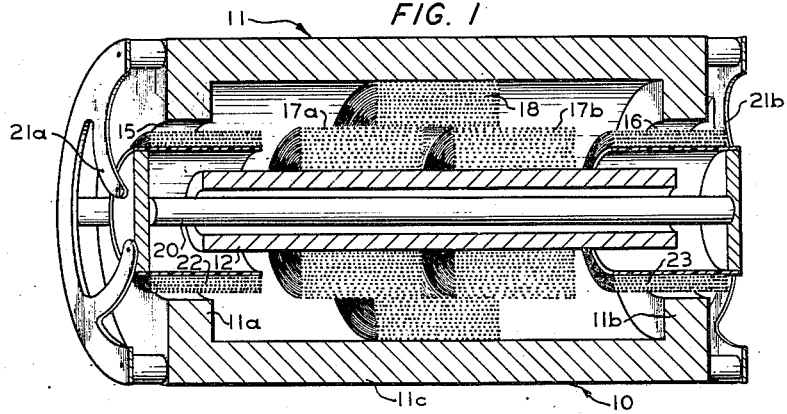
Figure 1 is a vertical sectional view of a transducer constructed in accordance with the invention.

Referring now to Figure 1, in one embodiment, the transducer includes a core 10 formed from an outer annular section 11 having pole pieces 11a, 11b joined by a central portion 11c. An annular core section 12 is mounted axially within the section 11 and secured thereto by the coils hereafter described so as to define annular air gaps 15, 16 with the adjoining pole pieces 11a, 11b, respectively. Both sections of the core are formed from paramagnetic material.

An excitation winding is defined by two annular coils 17a, 17b which are wound around the central core piece 12 and disposed in side-by-side relationship at the central portion of the member 12. An annular feedback winding or coil 18 is wound around the coil sections 17a, 17b, and this feedback winding is disposed centrally, with respect to the pole pieces 11a and 11b.

A rod 20, which extends axially within the core piece 12 is mounted for relative movement with respect to the core 10, as by leaf spring suspension units 21a, 21b and the rod 20 carries a pair of cylindrical signal windings or coils 22 and 23 which are mounted in opposite ends of the core section 12 within the respective air gaps 15 and 16. The spring suspension 21 thus permits limited axial movement of the signal windings 22, 23 with respect to the core 10.

Figure 2:
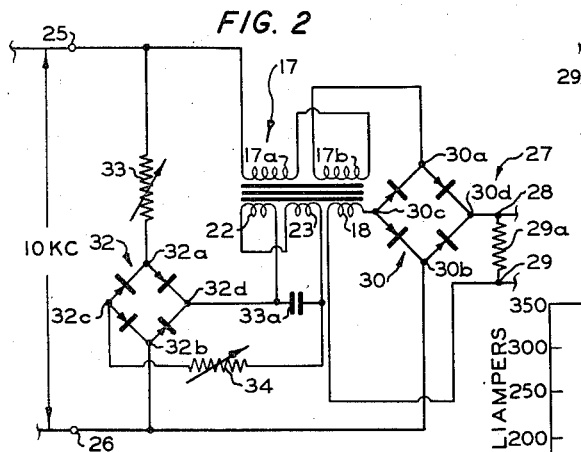
Figure 2 is a schematic circuit diagram of the transducer and associated circuitry.

Referring now to Figure 2, it will be noted that an alternating current source, indicated by terminals 25 and 26, is provided which can have any suitable frequency, for example, sixty cycles, 400 cycles or 10 kilocycles per second. An output circuit 27 includes output terminals 28 and 29, a load, represented by a fixed resistance 29a connected across the output terminals, the sections 17a, 17b of the winding 17, which are connected in series-opposing relationship, and the alternating current source 25 and 26.

The output circuit 27 also includes a rectifier bridge 30 having one set 30a, 30b of opposite terminals connected in series with the winding 17 and alternating current source 25, 26. The other set of opposite terminals 30c, 30d of the bridge 30 is connected in series with the feedback winding 18 and the output terminals 28, 29 with their load 29a. It will be evident that the impedance of the winding 17 controls the amount of alternating current from the source 25, 26 which is fed to the output terminals 28, 29. Moreover, a portion of the voltage appearing in the output circuit is rectified and applied to the feedback winding 18. In the circuit illustrated, the output voltage is a pulsating direct voltage which is a function of the displacement of the signal windings.

A direct bias voltage is applied to the signal windings 22, 23 which are connected in series-opposing relation by a circuit including a rectifier bridge 32. This bridge has one set 32a, 32b of opposite terminals connected to the respective terminals 25, 26 of the alternating current source through a variable resistance 33. The other set of opposite terminals 32c, 32d is connected in series with the signal windings 22, 23 and a variable resistance 34, the windings 22, 23 having a condenser 33a connected in parallel therewith. Condenser 33a constitutes a filter and is only intended to indicate the presence of a filter. More filtering than is provided by a single condenser may in some cases be required. Thus, a filtered direct voltage is applied to the signal coil winding which can be adjusted by the variable resistances 33 and 34.

Figure 4:
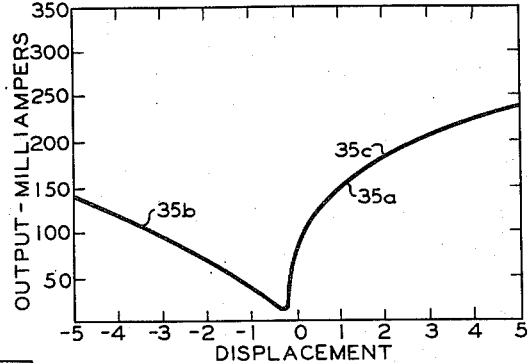
Figures 4 and 5 are graphs showing the characteristic curves of the transducer.

The displacement-output characteristic of the circuit is shown in Figure 4 for a circuit wherein the ampere turns of the coil 18 are within the range of 60 to 75 percent of the ampere turns of the winding 17. It will be noted that a steep characteristic is exhibited at the portion 35a of the curve close to zero displacement, while the curve is considerably more shallow at the portions 35b and 35c representing, respectively, positive and negative displacement of the signal coil. By a slight increase in the number of turns of the feedback winding 18, the characteristic of Figure 5 can be obtained wherein the steep part of the characteristic 36a is substantially a vertical line with more shallow rising portions 36b and 36c as the displacement is varied from zero.

Figure 5:
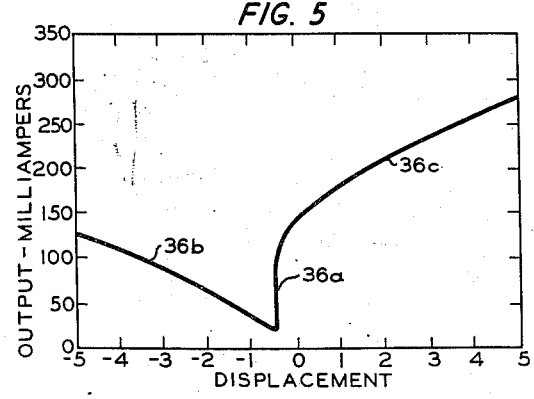

The characteristics illustrated by Figure 5 can be shifted laterally along the displacement axis by adjusting the bias fed to the signal coil 22, 23 through manipulation of variable resistances 33 and 34. Moreover, by substantially reducing the number of turns of the feedback winding 18, a characteristic can be obtained wherein the curve exhibits a more symmetrical rising pattern on each side of zero deflection while, by increasing the number of turns of the feedback winding 18, a condition of binary stability can be obtained, the characteristic curve generally resembling, in this instance, a hysteresis curve.

It will be evident from the foregoing, that the ampere turns ratio of the feedback and excitation windings determines the shape of the characteristic curve while the bias voltage applied to the windings 22, 23 determines the position of the characteristic curve along the displacement axis. Further, as the coils 22, 23 are mechanically displaced, the turns of one signal winding move closer to the core while the turns of the other signal winding move further away from the core. When this occurs, the effects of the signal coil, which were null at the neutral or rest position due to their series-opposing connection, no longer balance each other and a signal appears in the output circuit as determined by the characteristic curves. In particular, when operating at the steep portion 35a or 36a of the characteristic, a very large change in the output signal across the load resistor is produced by a small displacement of the signal windings.

Figure 3:
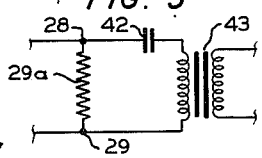
Figure 3 is a view of a schematic circuit diagram of a modified output circuit.

As previously noted, the circuit of Figure 2 produces a pulsating direct current output. This circuit is used where the displacement of the signal occurs slowly, i. e., the input is of essentially direct current character. Where the displacement is of a periodic or alternating character, the circuit of Figure 3 is utilized. In this circuit, the terminals 28 and 29 are connected through a condenser 42 to the primary winding of a transformer 43, and an alternating current signal is withdrawn from the secondary winding of this transformer. In this manner, the direct current component of the output signal is eliminated.

It will be evident that, with either modification of the circuit, the benefits of the invention are achieved in that a small displacement is converted into a large change in output current without use of a separate amplifying system. In this manner, a number of circuit components are eliminated without sacrifice of sensitivity and speed of response to the displacement to be measured.

In Figures 6 to 9, inclusive, I have illustrated several of the many important uses of the invention. Thus, in Figure 6, a pressure-responsive bellows 50 is mechanically connected to the rod 20 of the transducer so that an electrical output is produced responsive to changes in pressure upon the bellows. The electrical output can be fed to a pressure indicating system or, alternatively, to an alarm which registers whenever the pressure rises or falls a predetermined amount above or below a selected value.

In Figure 7, the rod 20 is mechanically connected to a Bourdon tube 51 which, in turn, is connected to a temperature sensing element 52 in a reactor 53 where the temperature is to be indicated or controlled. Expansion of the fluid within the element 52 causes movement of the Bourdon tube 51 which, in turn, moves the rod and signal coils of the transducer to produce an electrical output representative of temperature.

In Figure 8, the rod 20 is connected mechanically to a bi-metallic expansion element 54 supported by a base 55. Movement of the bi-metal strip responsive to temperature changes produces a corresponding movement of the rod and signal coils with resultant changes in the electrical output of the transducer.

In Figure 9, the rod 20 is connected to a member 56 whose deflection is to be measured, for example, a cantilever beam supported on a base 57. Slow, or rapid periodic movement of the beam in response to applied stress produces a corresponding movement of the rod and signal windings, with the result that the electrical output of the transducer is representative of the stress applied to the beam.

From the foregoing description, it will be evident that the transducer of my invention has varied useful applications in measurement and control of industrial operations. In particular, process variables which can be represented as a mechanical displacement are accurately transformed into corresponding electrical outputs without the necessity of providing bulky external amplifiers.

In Figure 10, I have shown a modified form of transducer. This unit includes two core sections 60 and 61 each having a central annular portion 62, an outer annular portion 63, a transverse section 64 and a pole piece 65, these pole pieces defining a pair of air gaps 66 and 67, respectively. All portions of the core are formed from paramagnetic material, and the sections 64 are separated by a magnetic shield 68 having sections 69 of insulative material on both sides thereof.

A rod 70 of non-magnetic material extends axially through the core section 62 and carries coils 71, 72 which are disposed within the respective air gaps 66 and 67. The assembly including coils 71, 72 is supported for relative movement with respect to the core by leaf springs 73 and 74. A pair of excitation windings 75 and 76 are disposed within the respective cores 60 and 61.

Referring now to Figure 11, it will be noted that a rectifier bridge 80 has one set 80a, 80b of opposite terminals connected to an alternating current source 81 through a variable resistance 82, the other set of opposite terminals 80c, 80d of the bridge being connected in series with a variable resistance 83 and the signal windings 71 and 72, a condenser 84 being connected in parallel with the windings 71 and 72. The source 81 is further connected to the primary winding of a transformer 85, the secondary winding of which is connected in parallel with two circuits. One of these circuits includes the excitation winding 75, a rectifier 86 and a rectifier 87 while the other circuit includes the excitation winding 76 a rectifier 88 and a rectifier 89. A load, represented by a resistance 90, has one terminal connected to the junction between rectifiers 86, 87 and its other terminal connected to the junction between rectifiers 88 and 89. It will be noted that no feedback winding is utilized in the circuit of Figure 11, and that an adjustable bias potential is applied to the signal windings 71, 72 in the manner already described in connection with Figure 2.

In operation, movement of the signal coil responsive to an external displacement causes one signal coil to move away from its associated core and the other signal coil to move closer to its signal coil, thus increasing the impedance of one winding 75, 76 and decreasing the impedance of the other winding of this set. This causes the voltage across load resistor 90 to vary as a function of the displacement of the signal coils. In this circuit, it will be noted that the coils 71, 72, while mechanically connected, function in two entirely separate magnetic circuits due to the interposition of the magnetic shield 68, Figure 10. The voltage across the load can be applied to control any suitable alarm or indicating device while the signal coils can be displaced in accordance with any variable to be measured, for example, as shown in Figures 6 to 9, inclusive. The circuit of Figure 11 is useful for the displacement to be measured varies slowly with time, i. e., is of a generally direct current nature.

Where the input displacement varies periodically, the circuit of Figure 12 is utilized. In this circuit, parts already described are indicated by reference numerals corresponding to those of Figure 11. In this circuit, the load, represented by a resistance 91, is connected in series with the secondary winding of transformer 85, and this series combination is connected in parallel with two circuits, one of which includes excitation winding 75 and a rectifier 92 connected in series, the other circuit including excitation winding 76 and a rectifier 93 connected in series, the rectifiers 92 and 93 being of opposite polarity.

This circuit functions in the manner described in connection with Figure 11, where a periodic displacement is applied to the signal coils 71 and 72.

While the invention has been described in connection with present, preferred embodiments thereof, it is to be understood that this description is illustrative only and is not intended to limit the invention.

I claim:

1. A transducer comprising, in combination, a core of paramagnetic material, a suspension, a signal winding secured to said suspension, an excitation winding and a feedback winding disposed in fixed relation to said core, all of said windings being magnetically coupled to said core, means supplying a fixed bias voltage to said signal winding, an output circuit including a load, a current source, and said excitation winding, means for feeding a portion of the output voltage from said circuit to said feedback winding, and means for effecting relative movement between said core and said signal winding in response to a displacement to be measured.

2. The transducer of claim 1 in which said last-mentioned means is a pressure-sensitive bellows mechanically connected to said signal winding.

3. The transducer of claim 1 wherein said last-mentioned means is a Bourdon tube mechanically connected to said signal winding and having a portion exposed to a zone wherein temperature is to be measured.

4. The transducer of claim 1 wherein said last-mentioned means is a bi-metallic expansion element mechanically connected to said signal winding.

5. The transducer of claim 1 wherein said last-mentioned means is a member whose deflection is to be measured, said member being mechanically connected to said signal winding.

6. A transducer comprising, in combination, a core of paramagnetic material, a signal winding mounted for relative movement with respect to said core, an excitation winding and a feedback winding in fixed position relative to said core, all of said windings being magnetically coupled to said core, a source of alternating current, a rectifier connecting said source to said signal winding to provide a predetermined bias voltage for said signal winding, an output circuit including a load, said excitation winding and said current source, a rectifier connecting said output circuit to said feedback winding to apply a direct current feedback voltage thereto, and means for effecting relative movement between said core and said signal winding responsive to a displacement to be measured.

7. A transducer comprising, in combination, a core of paramagnetic material, a signal winding mounted for relative movement with respect to said core, an excitation winding and a feedback winding in fixed position relative to said core and magnetically coupled thereto, a source of alternating current, a rectifier connecting said source to said signal winding to provide a predetermined bias voltage for said signal winding, an output circuit including a load resistor, a rectifier bridge, said excitation winding and said current source, said bridge having one set of opposite terminals connected in series with said current source and said excitation winding, and the other set of opposite terminals connected in series with said load and said feedback winding to apply a direct current feedback voltage thereto, and means for effecting relative movement between said core and said signal winding responsive to a displacement to be measured.

8. A transducer comprising, in combination, a core of paramagnetic material, a signal winding mounted for relative movement with respect to said core, an excitation winding and a feedback winding in fixed position relative to said core and magnetically coupled thereto, a source of alternating current, a rectifier connecting said source to said signal winding to provide a predetermined bias voltage for said signal winding, an output circuit including a load resistor, a rectifier bridge, said excitation winding and said current source, said bridge having one set of opposite terminals connected in series with said current source and said excitation winding, and the other set of opposite terminals connected in series with said load and said feedback winding to apply a direct current feedback voltage thereto, means for effecting relative movement between said core and said signal winding responsive to a displacement to be measured, and an output transformer having a primary winding connected through a condenser to said load resistor.

9. A transducer comprising, in combination, a core of paramagnetic material, a signal winding mounted for relative movement with respect to said core, an excitation winding and a feedback winding in fixed position relative to said core, all of said windings being magnetically coupled to said core, a source of alternating current, a resistor, a first rectifier bridge having one set of opposite terminals connected to the respective terminals of said current source through said resistor, a variable resistance, leads connecting the other set of opposite terminals of said rectifier bridge in series with said variable resistance and said signal winding, a second rectifier bridge, means connecting one set of opposite terminals of said second rectifier bridge in series with said excitation winding and said current source, a load, leads connecting the other set of terminals of said second rectifier bridge in series with said load and said feedback winding, and means for moving said signal winding relative to said core in response to a displacement to be measured.

10. A transducer comprising, in combination, a core of paramagnetic material, a signal winding consisting of two coils connected in series-opposing relation mounted for relative movement with respect to said core, an excitation winding consisting of two coils connected in series-opposed relationship and a feedback winding in fixed position relative to said core, all of said windings being magnetically coupled to said core, a source of alternating current, a first rectifier bridge having one pair of opposite terminals connected to the respective terminals of said current source, a variable resistance, leads connecting the other set of opposite terminals of said rectifier bridge through said variable resistance to said signal winding, a second rectifier bridge, means connecting one set of opposite terminals of said second rectifier bridge through said excitation winding to the respective terminals of said current source, a load resistance, leads connecting the other set of opposite terminals of said second rectifier bridge in series with said load and said feedback winding, the inductance of said windings, and the circuit resistances being adjusted to provide a steep output-displacement characteristic at a predetermined region of displacement and a shallow characteristic at other displacement regions, and means for moving said signal coils relative to said core in response to a displacement to be measured.

11. A transducer comprising, in combination, a core including an annular section and a cylindrical section disposed within and concentrically of said annular section, both sections being formed from paramagnetic material, a coil support, a spring suspension connecting said support to said core, a pair of cylindrical coils secured to said support and arranged to encircle opposite ends of said cylindrical core section, respectively, a pair of excitation coils connected in series-opposed relationship wound on the central portion of said cylindrical core piece, and a cylindrical feedback winding wound around said excitation windings.

12. A transducer comprising, in combination, a pair of magnetically separate core elements, a pair of excitation windings magnetically coupled to the respective core elements, a support mounted for relative movement with respect to said core elements, a pair of signal windings secured to said support, and magnetically coupled to the respective coils, means supplying a fixed bias voltage to said signal windings, a source of alternating current, a pair of circuits connected in parallel with said current source, one circuit including one excitation winding, a first rectifier and a second rectifier oppositely poled with respect to said first rectifier all connected in series, said second circuit including the other excitation winding, a third rectifier, and a fourth rectifier of opposite polarity with respect to said third rectifier all connected in series, said first and third rectifiers being of opposite polarity and said second and fourth rectifiers being of opposite polarity, and means connecting a load between the junctions of the two sets of rectifiers.

13. A transducer comprising, in combination, a pair of magnetically separate core elements, a pair of excitation windings magnetically coupled to the respective core elements, a support mounted for relative movement with respect to said core elements, a pair of signal windings secured to said support, and magnetically coupled to the respective coils, means supplying a fixed bias voltage to said signal windings, a source of alternating current, means connecting a load in series with said source, leads connecting the series combination of load and current source in parallel with two circuits, one circuit including one signal winding and a rectifier connected in series, the other circuit including the other signal winding and a second rectifier connected in series therewith, said rectifiers being of opposite polarity.

References Cited in the file of this patent

UNITED STATES PATENTS

| 2,118,862 | Rayment et al. | May 31, 1938 |
| 2,240,184 | Hathaway | Apr. 29, 1941 |
| 2,621,224 | Priest | Dec. 9, 1952 |

FOREIGN PATENTS

| 1,084,580 | France | July 7, 1954 |